United States Patent
Bombach et al.

[11] Patent Number: 5,928,050
[45] Date of Patent: Jul. 27, 1999

[54] TOY AND CREATIVITY TRAINING KIT

[76] Inventors: Mary J. Bombach; John Bombach, both of 7905 Tiffany Dr., Austin, Tex. 78749

[21] Appl. No.: 08/889,139

[22] Filed: Jul. 7, 1997

[51] Int. Cl.⁶ .............................. A63H 33/00; A63H 3/16
[52] U.S. Cl. ........................... 446/71; 446/100; 446/386
[58] Field of Search .................. 446/71, 72, 73, 446/75, 97, 99, 100, 101, 85, 369, 372, 385, 386, 901, 390

[56] References Cited

U.S. PATENT DOCUMENTS

| | | | |
|---|---|---|---|
| 1,535,925 | 4/1925 | Lee ........................................ | 446/100 |
| 1,942,370 | 1/1934 | Jacobsen . | |
| 2,302,349 | 11/1942 | Renshaw .............................. | 446/100 X |
| 3,748,779 | 7/1973 | Cherk et al. . | |
| 3,749,779 | 7/1973 | Cherk et al. ........................ | 446/386 X |
| 3,863,386 | 2/1975 | Kinberg . | |
| 3,977,121 | 8/1976 | Goldfarb et al. ...................... | 446/369 |
| 4,122,628 | 10/1978 | Crowel et al. .......................... | 446/100 |
| 4,333,974 | 6/1982 | Davis .................................... | 446/386 X |
| 4,573,927 | 3/1986 | Newman . | |
| 4,599,235 | 7/1986 | Miller et al. .......................... | 446/386 X |
| 5,046,985 | 9/1991 | Cearfoss . | |
| 5,195,893 | 3/1993 | Casale . | |
| 5,208,132 | 5/1993 | Kamada et al. ...................... | 446/394 X |
| 5,215,493 | 6/1993 | Zgrodek et al. . | |
| 5,322,718 | 6/1994 | Low ...................................... | 446/390 X |
| 5,518,436 | 5/1996 | Lund et al. .......................... | 446/369 X |

*Primary Examiner*—Robert A. Hafer
*Assistant Examiner*—D Neal Muir
*Attorney, Agent, or Firm*—Joseph F. Long

[57] ABSTRACT

A finger pressure sculptural and remakable toy comprising a stretchable container such as latex partially filled with an edible or non harmful shape retaining substance with the container having surface properties to allow marking on the surface with a normal colored marker and allowing adhesive connection of various accessories such as eyes, ears, tails etc, etc.

6 Claims, 2 Drawing Sheets

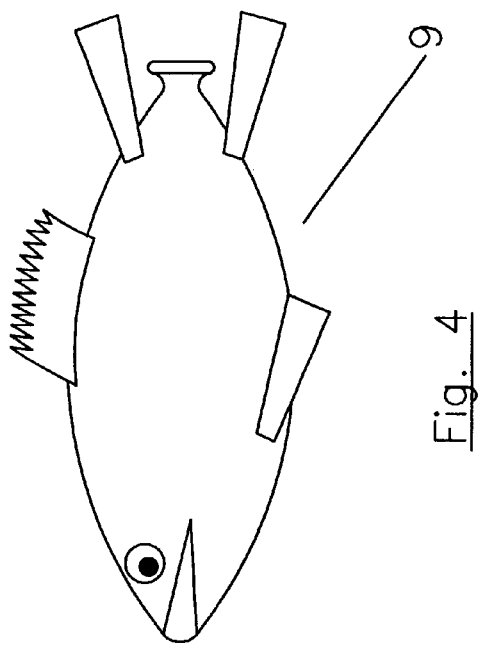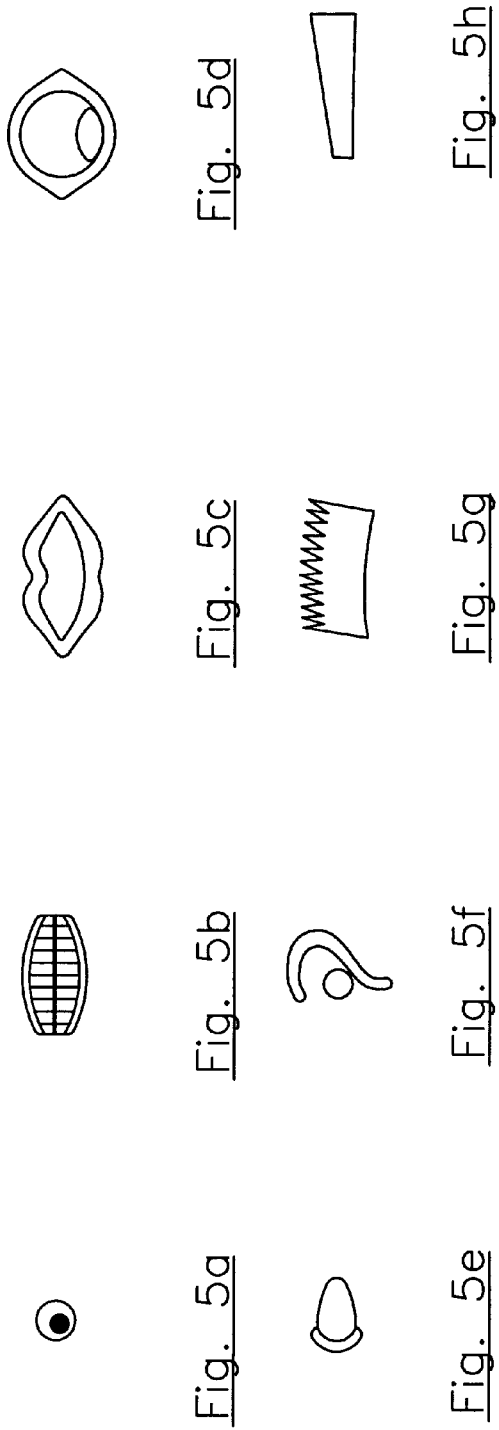

TOY AND CREATIVITY TRAINING KIT

BACKGROUND OF THE INVENTION

In general in United States more jobs are being formed by small creative companies than by large world wide companies and public school education is under attack from many fronts. Now, at present, there seems to be a general consensus that our children need better reading, writing, and mathematical skills. There are many people that also believe that we should not educate creativity and love of learning out of our children. This invention is aimed at the latter belief.

The invention allows a child to crudely sculpture with finger pressure an animal and with a marker and/or with adhesive accessories to make a recognizable sculpture that may be stored or immediately reformed or remade into a different real or imaginary animal. The basic invention comprises a low tensile strength stretchable plastic or rubber material such as a balloon that may be made in shapes that are elongated, round or globular, parabolic etc. and in various sizes for each shape. When these shapes are at least 80 percent filled, with 90 percent filling being preferable, with a shape retaining material such as unbleached flour or cornmeal the filled unit may be finger pressure sculptured into shapes resembling various animals including man. Colored markers and adhesively attachable accessories allow a child to draw upon the filled unit and to attach accessories to create a distinguishable animal or since various sizes of each shape are available to create a group or family of animals.

The inventor intends to sell the invention in kit form with a kit for a monster family, a fish family, a bookworm family, a lizard family, a shark family, a mythical family, a snake family, a sea life family, a penguin family, a dinosaur family, a silly cat family, a dog family, a frog family and many others. Each kit will contain markers, accessories, and picture book instructions and suggestions. Field trials have shown that children enjoy this invention as a toy and readily learn to create many various characterizations.

BRIEF SUMMARY OF THE INVENTION

The invention may be summarized as sculptural filled forms fabricated from various shapes of differing sizes of a low tensile strength stretchable material such as a heavy walled balloon. Each of the shapes may be about 80 to 90 percent filled with an edible or harmless material when ingested such as unbleached flour or cornmeal as normally ground for food usage. These materials are easy to manipulate manually and have been shown to have a reasonable shape holding tendency sufficient to allow marking on the exterior material. With colored markers, and various accessories that may glued on or adhesively applied a child may fill and shape or sculpture one or more of the forms to make objects resembling a fish, a shark, a human, a monster, a penguin, a cat, a person, a dog, a frog, etc. etc.

BRIEF DESCRIPTION OF THE DRAWINGS

FIG. 4 shows a third type of unfilled unit in a filled shaped, and accessorized form as an example of possible forms that a child could make.

FIG. 5a through FIG. 5h shows a group of accessories.

DETAILED DESCRIPTION OF THE DRAWINGS

The invention may best be described from the drawings. All the forms or shapes as shown as examples in FIG.'S 1 to 3 are fabricated from a low tensile strength stretchable material such as a latex rubber or a heavy walled balloon. Each of the shapes is about 80 to 90 percent filled with an edible or harmless material when ingested such as unbleached flour or cornmeal as normally ground for food usage. These materials are easy to manipulate manually and, by experimentation, have been shown to have a reasonable shape holding tendency sufficient to allow marking on the exterior material.

Figure 1:
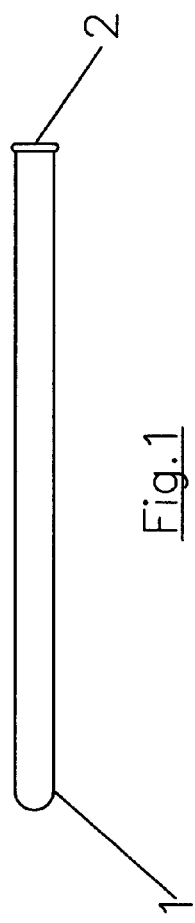
FIG. 1 shows one type of an unfilled unit

In FIG. 1 a long tubular shape of stretchable material 1 with a filling opening 2 is shown. The tube may be partially filled with unbleached flour, closed with a rubber band and marked to resemble a snake, or fishing worm or some imagined animal and could find a use as a bookmarker.

Figure 2:
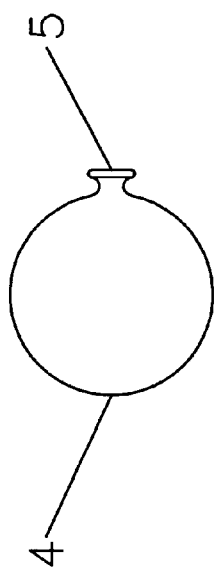
FIG. 2 shows a second type of unfilled unit

In FIG. 2 a round or globular unit 4 with a filling opening 5 is shown. When partially filled this unit is particularly suited to manual shaping, marking, and using glued on accessories, examples of which are shown in FIG. 5, to shape, mark and accessorized to form human heads, monster heads, animal heads etc.

Figure 3:
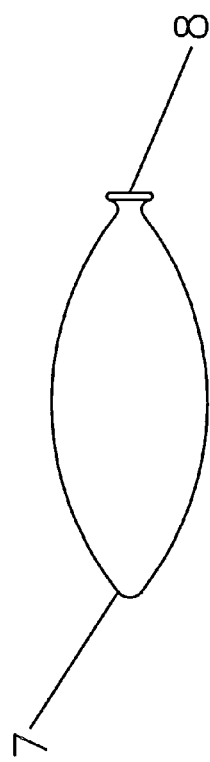
FIG. 3 shows a third type of unfilled unit

In FIG. 3 a flat oval shaped unit 7 with filling opening 8 is shown. When partially filled this unit is particularly suited to manual shaping, marking, and using glued on accessories, examples of which are shown in FIG. 5, to shape, mark and accessorize to form sea life families, penguin families, bugs, and other imagined shapes. All forms as indicated in FIG.'S 1, 2, and 3 are available in similar shapes and different sizes thus allowing creation of many different types of real or imagined families, including but not limited to monster family, fish family, book worm marker family, lizard family, shark family, snake family, a mythical family, penguin family, a dinosaur family, a cat family, a dog family, a butterfly family, a frog family, and others.

In FIG. 4 a unit marked 9 of FIG. 3 is shown partially filled and marked and accessorized using accessories as shown in FIG. 5 to resemble a fish. This is shown as an example but numerous other shapes for each of different sizes of the shapes as shown in FIG.'S 1, 2, and 3, as well as visualized other shapes would be within the purview of this invention.

In FIGS. 5a through FIG. 5h a group of accessories that may used on the various filled shapes in FIG.'S 1, 2, and 3 are shown. Each of these accessories are normally supplied with an adhesive backing but may also be glued on to one of the partially filled shapes. Material to allow a child to form his or her own accessories is also included when one or more of the shapes is sold in kit form. In these figures an eye is shown as FIG. 5a; teeth are shown as FIG. 5b; lips are shown as FIG. 5c; a mouth is shown as FIG. 5d; a fingernail is shown as FIG. 5e; an ear is shown as FIG. 5f; a dorsal fin is shown as FIG. 5g and a fish tail or flipper is shown as FIG. 5h. These are meant to be examples of accessories with many other similar accessories being within the purview of this invention.

What is claimed is:

1. A toy and training kit comprising
    a. a finger pressure sculptural means, said sculptural means comprising
        a low tensile strength stretchable material container means filled to a minimum of eighty percent of unstretched capacity with an edible material means; said edible material means being unbleached flour
        said container means having a surface to allow marking upon said surface with conventional markers,
        said unbleached flour having shape retaining properties, b. multiple accessory means with said accessory means having surface properties to removably and adhesively attach to said container means.

2. A toy and training kit as in claim 1 wherein said container means is in a long tubular shape when unfilled.

3. A toy and training kit as in claim 1 wherein said container means is in a globular shape when unfilled.

4. A toy and training kit as in claim 1 wherein said container means is in an oval shape when unfilled.

5. A toy and training kit as in claim 1 wherein said accessory means comprise animal parts means with eyes, teeth, mouths, lips, nails, fins, and tails being examples of said animal parts means.

6. A toy and training kit comprising
a. a finger pressure sculptural means, said sculptural means comprising
   a low tensile strength stretchable material container means;
   an edible cornmeal to fill said container means to a minimum of eighty percent of unstretched capacity;
   said container means having a surface to allow marking upon said surface with conventional markers,
   said cornmeal having shape retaining properties,
b. multiple accessory means with said accessory means having surface properties to removably and adhesively attach to said container means.

\* \* \* \* \*